United States Patent
Park

(10) Patent No.: US 7,068,921 B1
(45) Date of Patent: Jun. 27, 2006

(54) METHOD OF ARRANGING DIVIDED RECORDING AREA SEGMENTS OF RECORDING MEDIUM IN BROADCAST RECEIVING SYSTEM

(75) Inventor: Chong-Mok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 844 days.

(21) Appl. No.: 09/628,810

(22) Filed: Jul. 28, 2000

(30) Foreign Application Priority Data

Jul. 28, 1999 (KR) ........................................ 1999-30938

(51) Int. Cl.
H06N 5/85 (2006.01)
H06N 5/91 (2006.01)

(52) U.S. Cl. ........................................ 386/125; 386/83
(58) Field of Classification Search ................... 386/45, 386/125, 126, 83, 124, 105, 106, 92, 46, 386/1, 40; 360/7; H04N 5/85, 5/91
See application file for complete search history.

(56) References Cited

U.S. PATENT DOCUMENTS

| | | | | |
|---|---|---|---|---|
| 4,789,979 A | * | 12/1988 | Hiraoka et al. | 369/275.4 |
| 5,371,551 A | * | 12/1994 | Logan et al. | 348/571 |
| 5,438,423 A | | 8/1995 | Lynch et al. | |
| 5,555,463 A | | 9/1996 | Staron | |
| 5,656,348 A | * | 8/1997 | Kudo et al. | 428/64.1 |
| 5,701,383 A | * | 12/1997 | Russo et al. | 386/46 |
| 5,754,882 A | | 5/1998 | Tobagi et al. | |
| 5,761,692 A | * | 6/1998 | Ozden et al. | 711/4 |
| 5,870,523 A | * | 2/1999 | Kikuchi et al. | 386/95 |
| 5,999,691 A | * | 12/1999 | Takagi et al. | 386/46 |
| 6,002,832 A | * | 12/1999 | Yoneda | 386/65 |
| 6,018,612 A | * | 1/2000 | Thomason et al. | 386/82 |
| 6,169,842 B1 | * | 1/2001 | Pijnenburg et al. | 386/46 |
| 6,233,389 B1 | * | 5/2001 | Barton et al. | 386/46 |
| 6,233,390 B1 | * | 5/2001 | Yoneda | 386/46 |
| 6,240,244 B1 | * | 5/2001 | Ikeda | 386/125 |
| 6,304,714 B1 | * | 10/2001 | Krause et al. | 386/52 |
| 6,311,011 B1 | * | 10/2001 | Kuroda | 386/46 |
| 6,385,386 B1 | * | 5/2002 | Aotake | 386/68 |
| 6,442,327 B1 | * | 8/2002 | Yamada et al. | 386/46 |
| 6,647,201 B1 | * | 11/2003 | Yoshimura et al. | 386/68 |

FOREIGN PATENT DOCUMENTS

WO  WO 96/33579  * 10/1996

OTHER PUBLICATIONS

David P. Anderson, et al., "A File System for Continuous Media", ACM Transactions on Computer Systems (TOCS), vol. 10, Issue 4 (Nov. 1992); 7 pages printed from the Internet on Jul. 8, 2005, available at: http://doi.acm.org/10.1145/138873.138875.

A.L. Narasimha Reddy, et al., "I/O Issues in a Multimedia System", IEEE Computer Society, Computer Archive, vol. 27, Issue 3 (Mar. 1994); 5 pages printed from the Internet on Jul. 8, 2005, available at: http://doi.ieeecomputersociety.org/10.1109/2.268888.

Computer Communications, vol. 18, No. 3, "Multimedia File System Survey: Approaches for Continuous Media Disk Scheduling" (Not Included).

* cited by examiner

*Primary Examiner*—Robert Chevalier
(74) *Attorney, Agent, or Firm*—Staas & Halsey LLP

(57) ABSTRACT

A method of arranging divided recording area segments of a recording medium in a broadcast receiving system having a random access storage device. In the method, a circular buffer area is disposed in a first predetermined position of the recording medium, for recording a first broadcast signal in real time while reproducing a previously recorded second broadcast signal, a video file area is disposed in a second predetermined position of the recording medium, for recording a third broadcast signal in a logical file at a predetermined time, and a control information area is disposed in a third predetermined position of the recording medium, for recording information about recorded files.

36 Claims, 8 Drawing Sheets

METHOD OF ARRANGING DIVIDED RECORDING AREA SEGMENTS OF RECORDING MEDIUM IN BROADCAST RECEIVING SYSTEM

CROSS-REFERENCE TO RELATED APPLICATIONS

This application claims the benefit of Korean Application No. 99-30938, filed Jul. 28, 1999, in the Korean Patent Office, the disclosure of which is incorporated herein by reference.

BACKGROUND OF THE INVENTION

1. Field of the Invention

The present invention relates generally to a broadcast receiving system which can simultaneously support time-delayed watching of a broadcast program and recording/reproduction of another program, and in particular, to a method of arranging divided recording area segments in a recording medium to allow time-delayed watching of a broadcast program, while another program is being recorded/reproduced.

2. Description of the Related Art

A hard disk drive (HDD) in a computer system is randomly accessible. Due to its advantages of low cost and large capacity relative to other auxiliary memories and a high data transmission rate, the HDD is used as a random access storage device for a broadcast receiving system.

A broadcast receiving system with a random access storage device enables simultaneous recording/reproduction and time-delayed broadcasting of video streams. This can be achieved by controlling buffering of video streams input/output to/from an HDD.

There will be given a description of a method of arranging video streams on a hard disk surface as a recording medium in a broadcast receiving system which supports simultaneous time-delayed watching and recording/reproduction of the video streams.

FIG. 1 illustrates a hard disk managed as a circular buffer in a broadcast receiving system for time-delayed watching, and FIG. 2 illustrates a hard disk managed to record a plurality of video streams uncontinuously.

In the case of a hard disk managed as a circular buffer, video streams are recorded in blocks of a fixed size as shown in FIG. 1. A write point W and a read point R are set on a surface of the hard disk. New video streams are recorded, moving a head clockwise from the write point W, and predetermined video streams are played back by randomly accessing the circular buffer at a specific time.

On the other hand, to uncontinuously arrange video streams on a hard disk drive as shown in FIG. 2, a surface of the hard disk is divided into blocks of a fixed size and video streams are recorded in video files, each including a plurality of blocks. In this case, the blocks are not successively arranged because deletion of video files of different sizes result in uncontinuous free blocks. Information about each video file (title, time information, and so on) and information about the positions of blocks in each video file are recorded in a control information area.

FIGS. 3A through 3D are exemplary I/O (Input/Output) transaction scheduling diagrams for an HDD on/from which video streams are recorded/reproduced in real time. In FIGS. 3A through 3D, three video streams are processed using a C-LOOK algorithm by way of example. The C-LOOK algorithm is similar to a SCAN-Earliest-Deadline-First (SCAN-EDF) scheme disclosed in "I/O Issues in a Multimedia System," Reddy A. L. N. and Wyllie J. C., IEEE Computer Vol. 27. No. 3, March 1994, pp. 67–74, "Multimedia File Systems Survey: Approaches for Continuous Media Disk Scheduling," Ralf Steinmetz, Computer Communications, Vol. 18, No. 3, March 1995, pp. 133–144, and a gated operation disclosed in U.S. Pat. No. 5,754,882. Hence, its description is omitted herein.

Referring to FIGS. 3B through 3D, video streams #1 and #2 are being played back and video stream #3 is being recorded. In most video stream processing methods, an HDD I/O control is implemented at every predetermined period T and video streams are processed in each period. For example, if video streams #1 and #2 are read from corresponding blocks on a hard disk surface in period $T_{i-1}$, they are played back in period $T_i$ (this corresponds to consumption from a video processor's viewpoint). For continuous reproduction without interruption, blocks to be played back (a process to read data, store the read data in a buffer, and then supply the stored data to a user visibly and/or audibly) in the next period should be read from the HDD in the current period. For recording, blocks should be generated in the current period and then transmitted to the HDD in the next period. The order of processing video streams in a period depends on an I/O transaction scheduling scheme. In the C-LOOK algorithm, the order of processing video streams corresponds to a head moving direction. Assuming that a head of the HDD is moving from an outermost circumferential track to an innermost circumferential track and video stream blocks #1, 2, and 3 are located in tracks #10, 100, and 60, respectively, the video streams #1, 3, and 2 are accessed to read or write in this order in $T_i$ as shown in FIGS. 3A through 3D.

A broadcast receiving system which manages a hard disk area as a circular buffer as shown in FIG. 1 can reproduce a previously recorded video stream with a time delay while recording a current video stream by buffer-controlling data to be input and output to the HDD. However, it cannot record and reproduce a plurality of video streams at the time. In other words, the previously recorded data of a specific channel can not be reproduced while recording a plurality of video streams (i.e., the corresponding broadcast signals to be input from a plurality of channels) since data buffering control is not easy, and is inefficient because of the data access speed of the HDD. In addition, video streams cannot be formed in video file units and an arbitrary video file cannot be deleted.

On the other hand, a broadcast receiving system which arranges video streams uncontinuously as shown in FIG. 2 can store recorded video streams in video files since it can utilize hard disk space freely. But buffer management for time-delayed watching is not easy because blocks are not automatically reused in a limited area as compared to a circular buffer. This is because free blocks are scattered.

SUMMARY OF THE INVENTION

It is, therefore, an object of the present invention to provide a method of overcoming conventional problems encountered in using a recording area of a recording medium in a broadcast receiving system which can support time-delayed watching and recording/reproduction of broadcast programs at the same time.

It is another object of the present invention to provide a method of efficiently managing divided recording area segments of a recording medium to simultaneously provide time-delayed watching and recording/reproduction of a plurality of video streams in a broadcast receiving system.

It is a further object of the present invention to provide a method of managing divided recording area segments of a recording medium to simultaneously provide time-delayed watching and high speed recording/reproduction of a plurality of video streams in a broadcast receiving system.

Additional objects and advantages of the invention will be set forth in part in the description which follows and, in part, will be obvious from the description, or may be learned by practice of the invention.

These and other objects of the present invention can be achieved by providing a method of arranging divided recording area segments of a recording medium in a broadcast receiving system having a random access storage device. In the method, a circular buffer area is disposed in a first predetermined position of the recording medium, for recording a first broadcast signal in real time while reproducing a previously recorded second broadcast signal, a video file area is disposed in a second predetermined position of the recording medium, for recording a third broadcast signal in a logical file at a predetermined time, and a control information area is disposed in a third predetermined position of the recording medium, for recording information about recorded files. When a user commands a function of time-delayed watching and leaves a television set, the broadcast signal of the channel currently being watched from this point in time is stored in a circular buffer area. Thus, a user has access to reproduce a broadcast signal and to see a screen from the point in time that he or she leaves the television set. In this case, the continuously received broadcast signal is continuously recorded and stored in a circular buffer area, to be reproduced after a predetermined time passes.

BRIEF DESCRIPTION OF THE DRAWINGS

These and other objects and advantages of the invention will become apparent and more readily appreciated from the following description of the preferred embodiments, taken in conjunction with the accompanying drawings of which.

The above and other objects, features and advantages of the present invention will become more apparent from the following detailed description when taken in conjunction with the accompanying drawings in which.

DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 4:
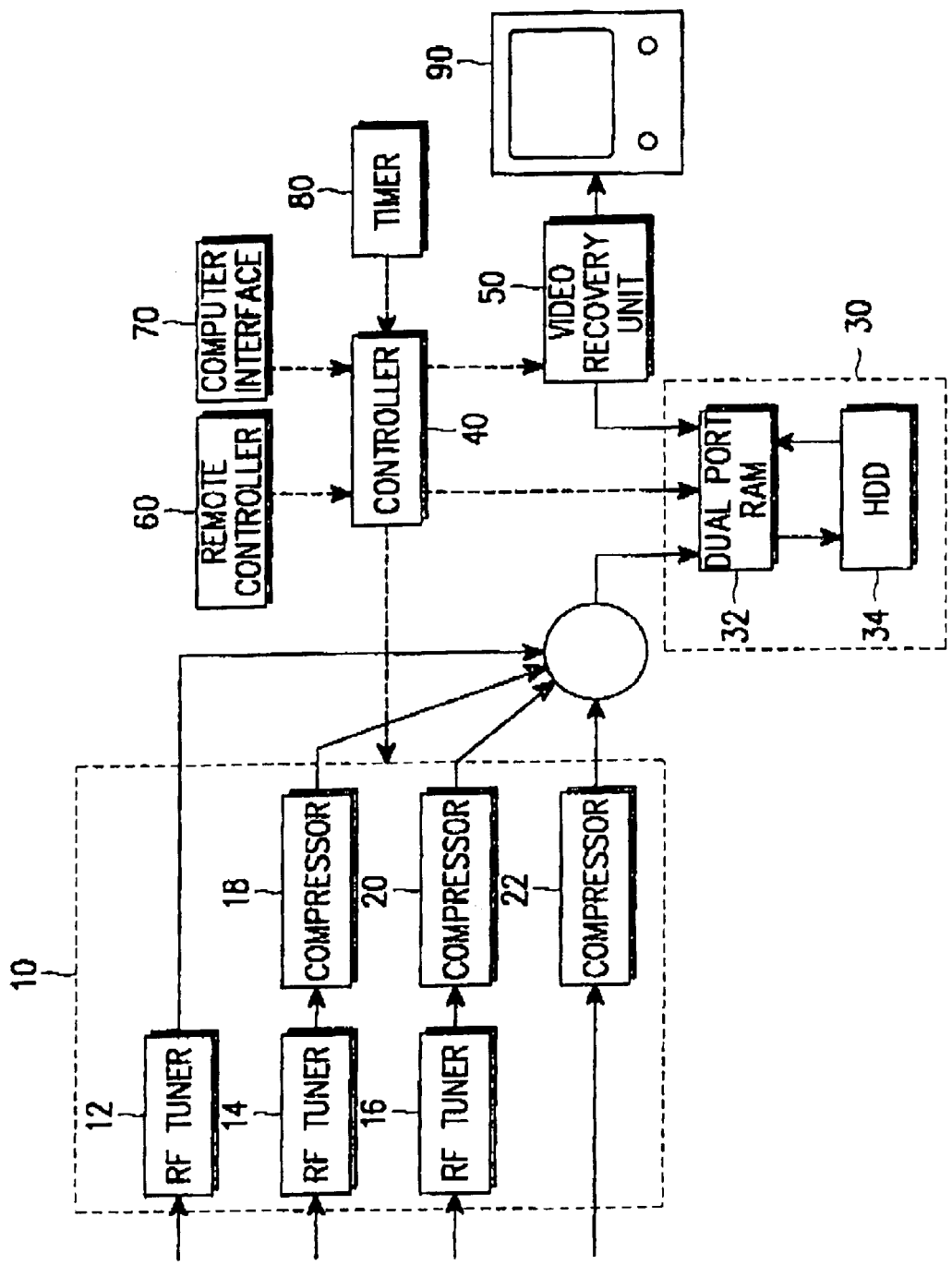
FIG. 4 is a block diagram of a broadcast receiving system which can support time-delayed watching and recording/reproduction of a broadcast program according to an embodiment of the present invention.

FIG. 4 is a block diagram of a broadcast receiving system capable of broadcasting a program with a time delay and recording/reproducing another program simultaneously. In this instance, the broadcast receiving system enables recording of a broadcast signal of one channel while simultaneously recording a broadcast signal of another channel.

Referring to FIG. 4, a broadcast signal receiver 10 includes an RF (Radio Frequency) tuner 12 for receiving an external digital broadcast signal, RF tuners 14 and 16 for receiving external analog broadcast signals, and video compressors 18 and 20 for converting analog signals received from the RF tuners 14 and 16 to digital signals and compressing the converted digital signals, respectively. A compressor (input signal processor) 22 receives a video baseband signal which is simply compressed. The outputs of the compressors 18, 20 and 22 are supplied to a switching node 23, which provides its output to a dual port RAM 32.

A random access storage device 30 records digital video streams received from the broadcast signal receiver 10 on a hard disk surface (not shown), reads the stored video streams, and outputs the read video streams to a video recovery unit 50 under the control of a controller 40. As is well known, the random access storage device 30 comprises the dual port RAM 32 for temporarily storing the digital video streams, a hard disk (hard disks) for permanently storing the digital video streams, an HDD controller for controlling the HDD to be driven, and a expander for expanding the HDD. The expander is an IEEE 1394 interface.

The video recovery unit 50 recovers a video stream received from the random access storage device 30 through a system bus to an original signal and outputs the recovered original signal to a TV receiver 90.

The controller 40 includes a ROM for storing control program data to control the random access storage device 30 and the broadcast signal receiver 10 and a RAM for temporarily storing data generated during a control operation.

A remote controller 60 has a plurality of adjustment keys for system control, generates data corresponding to a key input, and feeds the data to the controller 40. The adjustment keys are "pause", "rewind", "rapid search", and so on.

A computer interface 70 interfaces a transmitted/received signal between the broadcast receiving system of the embodiment of the present invention and a computer. A timer 80 generates time information so that the broadcast receiving system can record a program automatically.

Figure 5:
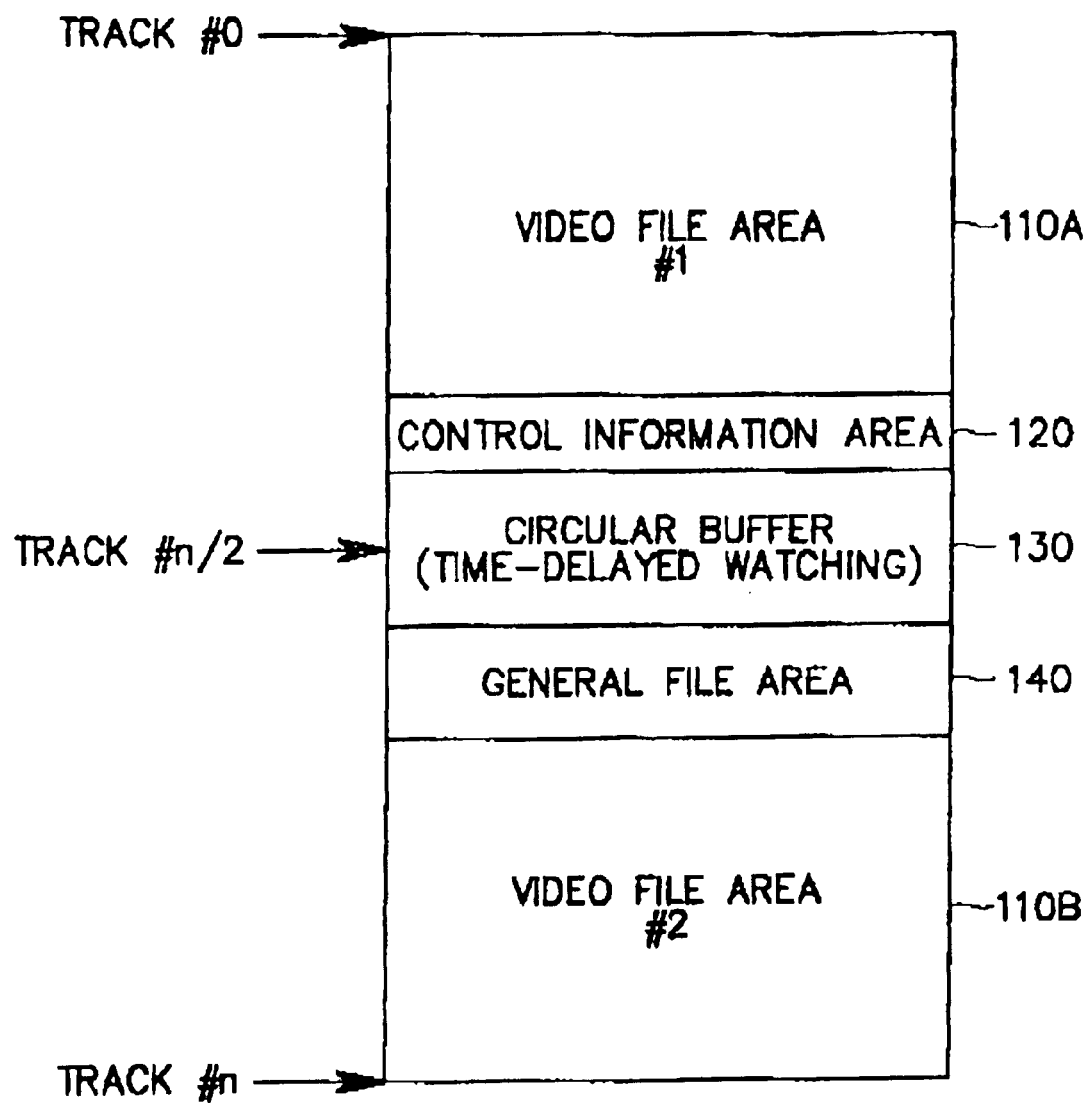
FIG. 5 illustrates arrangement of hard disk recording area segments according to the embodiment of the present invention.

FIG. 5 illustrates a hard disk recording area according to the embodiment of the present invention. Here, the recording area is divided into four segments. The hard disk recording area covers the area from an outermost circumferential track (track #0) to an innermost circumferential track (track #n). The hard disk recording area is divided into video file areas #1 and #2 110A and 110B, a control information area 120, a circular buffer area 130 for time-delayed watching, and a general file area 140, to thereby enable simultaneous time-delayed watching and recording/reproducing of broadcast programs with efficiency.

The circular buffer area 130 is used to record a broadcast signal which is currently being broadcast and reproduce a previously recorded broadcast signal in real time. The circular buffer area 130 can be positioned anywhere in the hard disk recording area, preferably includes tracks at both sides of a center track (2/n) to minimize a search time of a head for time-delayed watching and recording/reproducing a specific channel broadcast signal at the same time.

Figure 1:
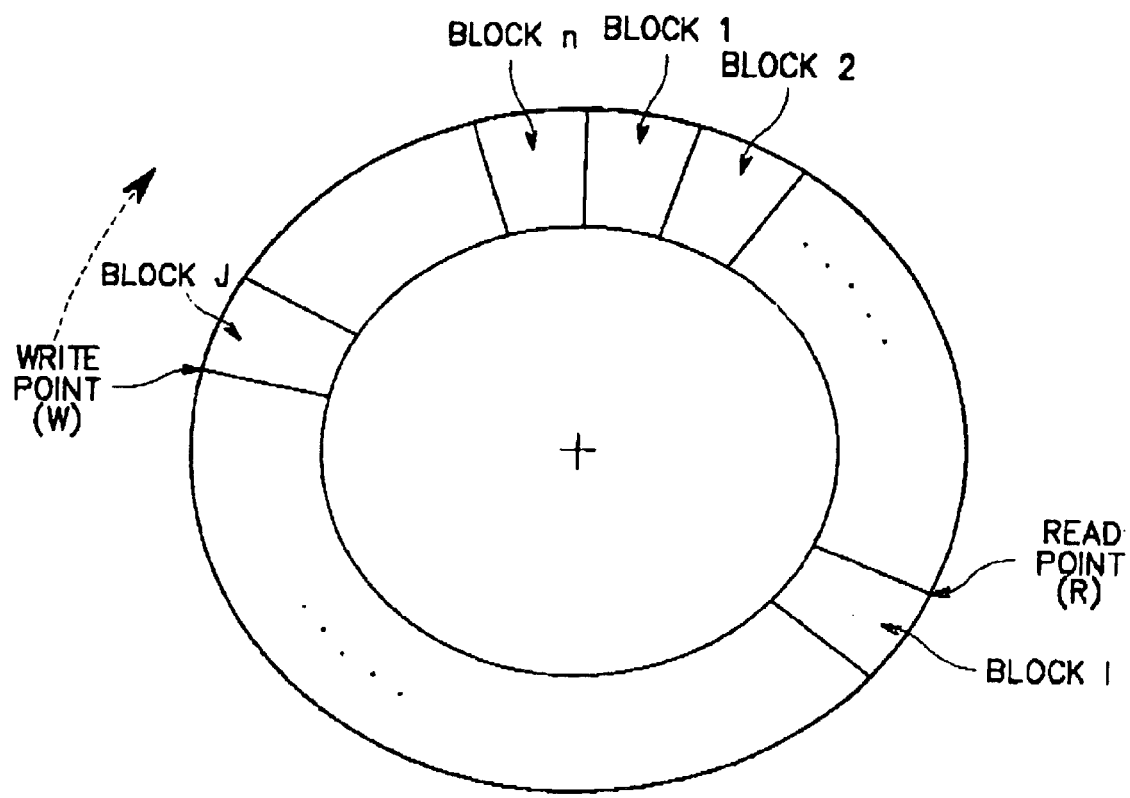
FIG. 1 illustrates a conventional hard disk managed as a circular buffer in a broadcast receiving system for time-delayed watching.
Figure 2:
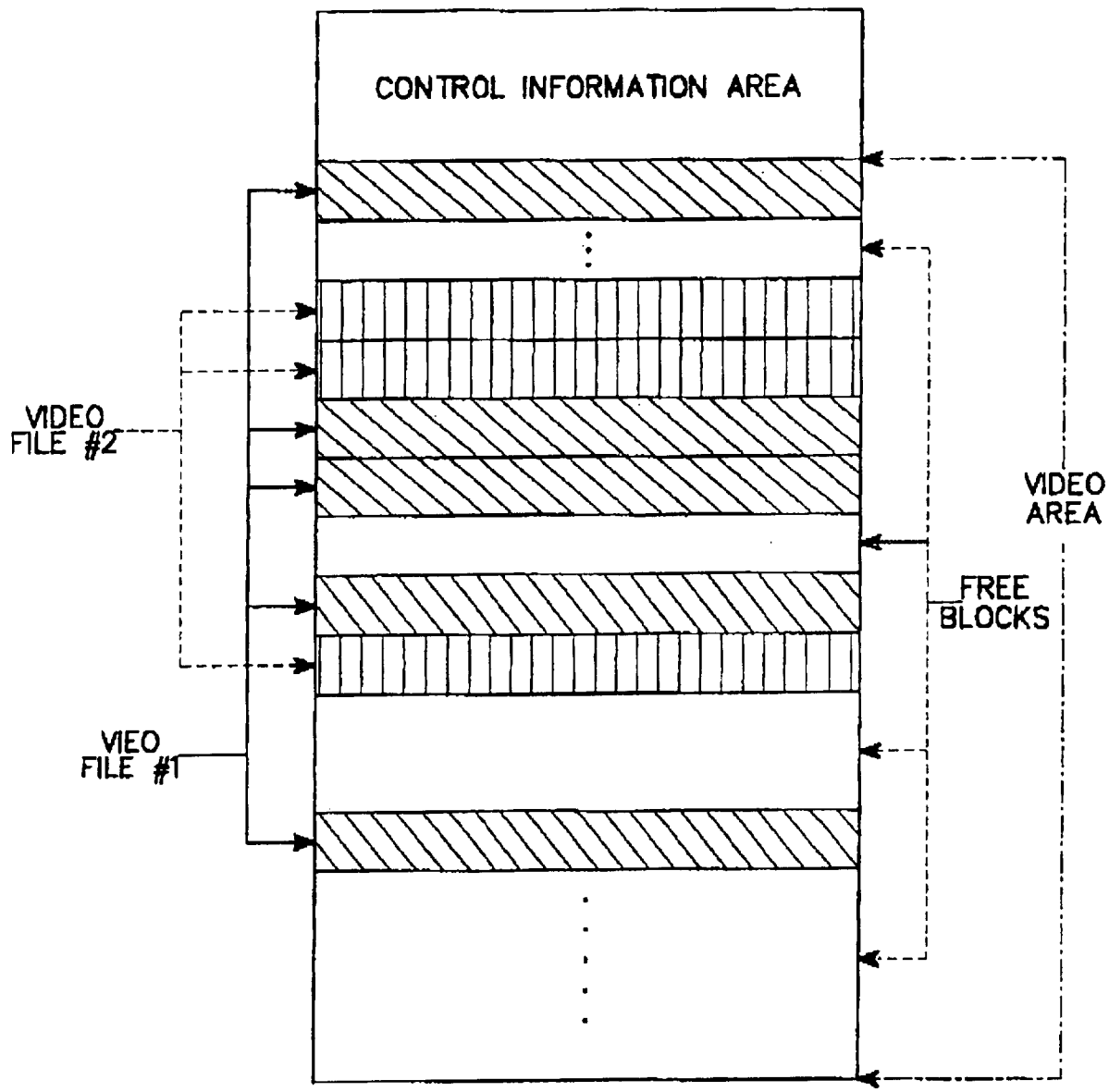
FIG. 2 illustrates a conventional hard disk managed to arrange a plurality of video streams uncontinuously.
Figure 3:
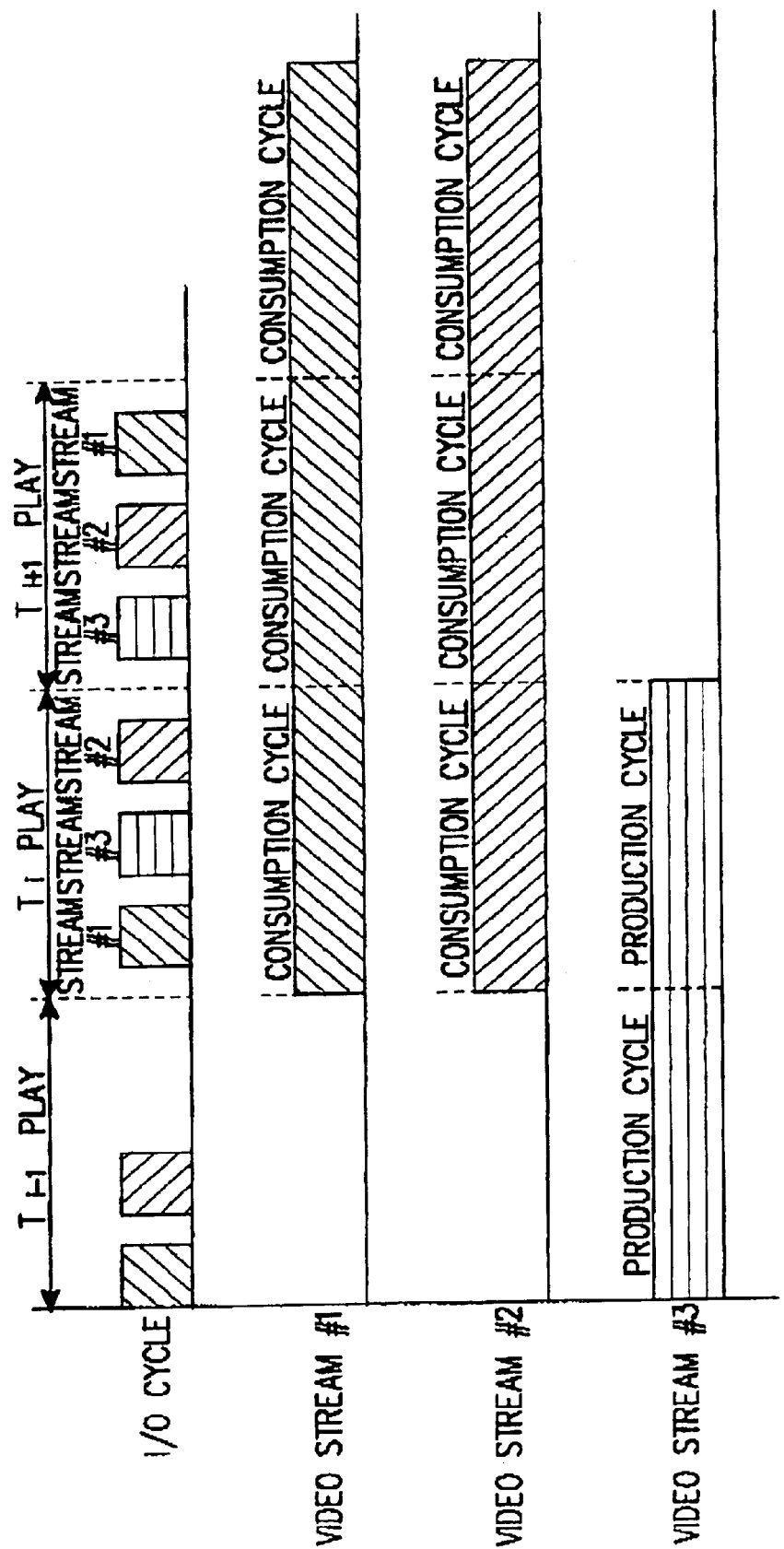
FIGS. 3A through 3D are exemplary I/O transaction scheduling diagrams of a conventional HDD for recording and reproducing a plurality of video streams in real time.

The video file areas #1 and #2 110a and 110B, arranged respectively in outer circumferential tracks and inner circumferential tracks, are used to record a broadcast program at a reserved time. In the video file areas 110a and 110b, recorded video streams are arranged uncontinuously in logical files according to a recorded time as shown in FIG. 2.

The general file area 140 is also managed in the non-continuous arranging method to store information other than continuous information like video streams, such as text information as general information other than video information.

The control information area 120 stores information related with each video file, such as title and time information and positions of blocks in each file.

Figure 6:
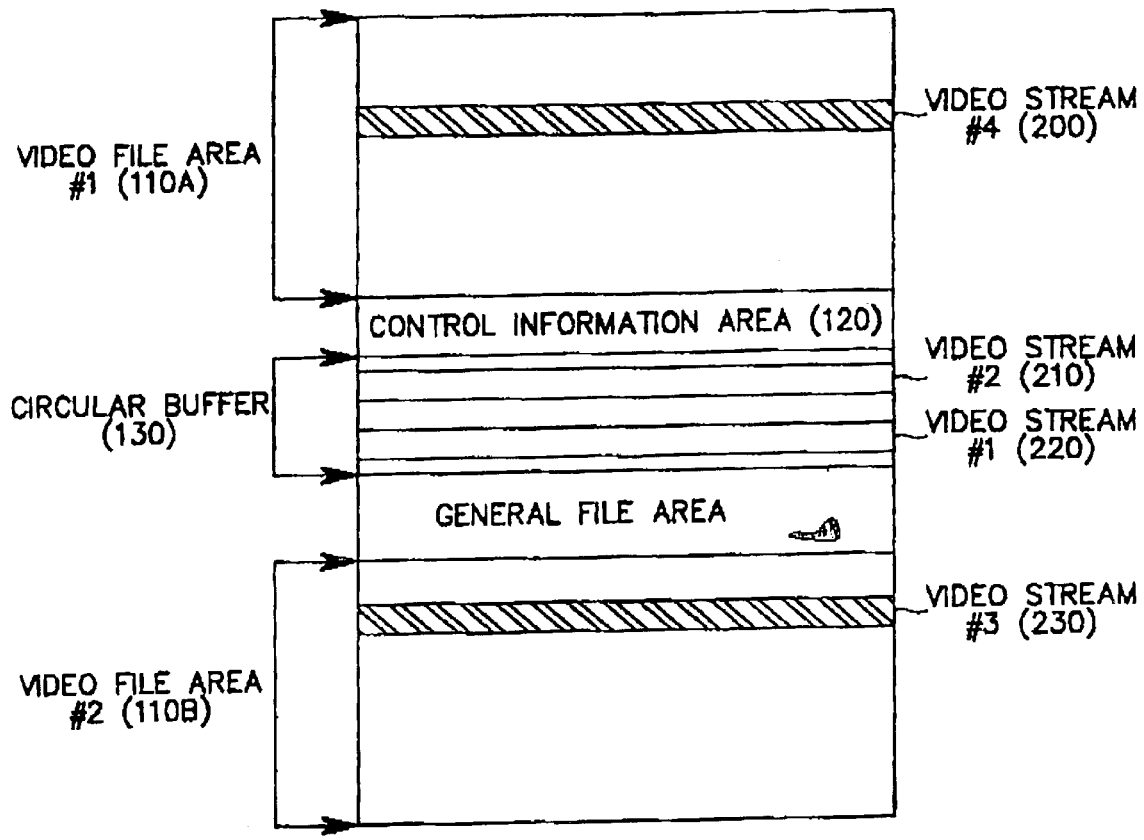
FIG. 6 illustrates video streams recorded in the hard disk recording area segments according to the embodiment of the present invention.
Figure 7:
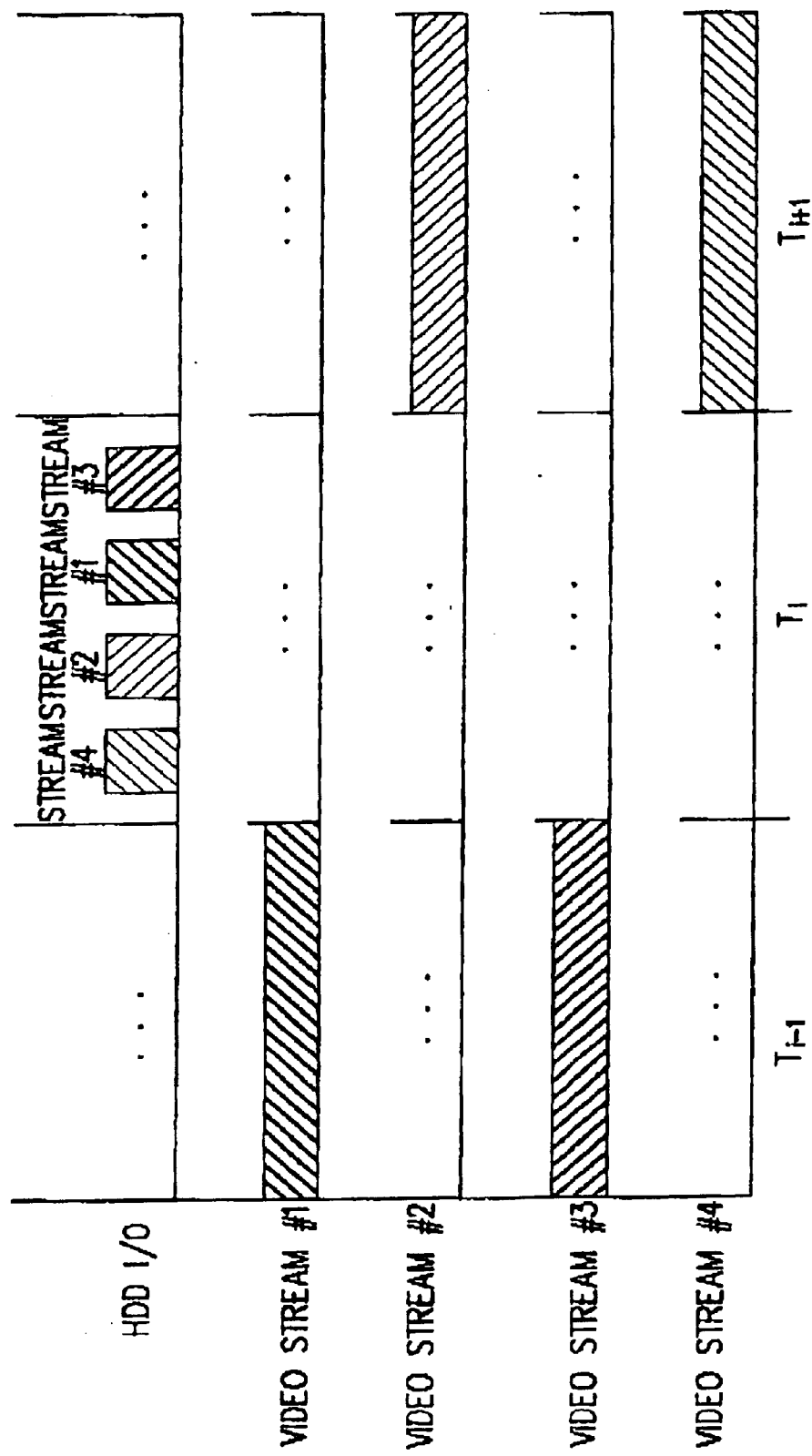
FIG. 7 illustrates a procedure of processing streams assigned as shown in FIG. 6 in a C-LOOK algorithm.

FIG. 6 illustrates video streams recorded and stored in the hard disk recording area divided according to the embodiment of the present invention. Here, four video stream blocks are arranged in their corresponding areas. FIG. 7 illustrates a procedure of processing each stream assigned as shown in FIG. 6 in a C-LOOK algorithm.

In FIG. 6, video stream #1 220 is being recorded in the circular buffer area 130 for time-delayed watching. Video stream #2 210 is already recorded for time-delayed watching. Video stream #3 230 is being recorded in video file area #2 110B and has nothing to do with a broadcast program currently being watched by a user. Video stream #4 is already recorded in video file area #110A.

If time-delayed watching and reproduction are selected simultaneously, video streams are read or recorded in an ascending track number order in the C-LOOK algorithm. In this case, a video stream I/O processing order of the HDD 34 is 4, 2, 1, and 3. Thus, video streams #1 and #3 220 and 230 are input to the dual port RAM 32 in $T_{i-1}$ and recorded in assigned recording areas of the HDD 34. Meanwhile, video streams #2 and #4 210 and 200 are read from the hard disk recording area in $T_i$ and output to the video recovery unit 50 in $T_{i+1}$. On the assumption that video streams are continuously reproduced without delay, a video stream should be read from the recording area in each period so that it can be reproduced in the next period. For recording, a video stream should be generated in the period previous to a recording period.

As described above, arrangement of the circular buffer area 130 in the center of the hard disk recording area can minimize an average head moving time, that is, an average search time, as compared to an otherwise case.

Figure 8:
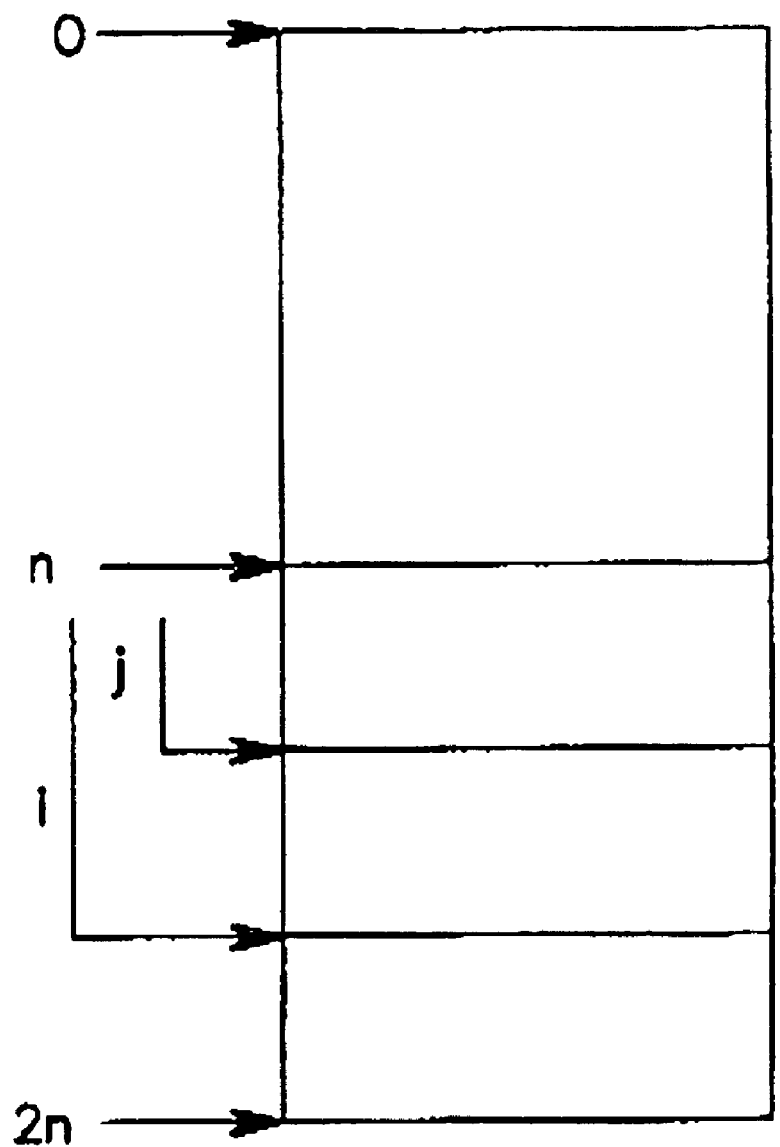
FIG. 8 is a simplified view of a hard disk recording area according to the embodiment of the present invention.

FIG. 8 is a simplified view of the hard disk area according to the embodiment of the present invention. In FIG. 8, tracks where two video stream blocks are recorded are spaced from n by i and j, respectively. If a circular buffer area is positioned at n, i tracks should be searched to process a video stream in the circular buffer area and other two video stream blocks in the C-LOOK algorithm. On the other hand, if the circular buffer area is positioned at track #0, (i+n) tracks, an n-increased distance should be searched. In this context, the present invention can reduce a head moving time since time-delayed watching can be implemented simultaneously with recording/reproduction.

In accordance with the present invention as described above, a recording area of a recording medium is divided into a circular buffer area and a non-continuous file area in a broadcast receiving system capable of simultaneous time-delayed watching and recording/reproduction of a broadcast program. Hence, the recording area in a limited space is automatically reused and video streams are formed in logical video files. In addition, recorded video files can be selectively deleted, a head search time is reduced, and a data access rate is increased.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of arranging divided recording area segments of a recording medium in a broadcast receiving system having a random access storage device, comprising:
   disposing a circular buffer area in a first predetermined position of the recording medium, for recording a first broadcast signal in real time while reproducing a previously recorded second broadcast signal;
   disposing a video file area in a second predetermined position of the recording medium, for recording a third broadcast signal in a logical file at a predetermined time; and
   disposing a control information area in a third predetermined position of the recording medium, for recording information about the first, second and third broadcast signals.

2. The method of claim 1, wherein the disposing of the video file area comprises dividing the video file area into a plurality of segments and individually managing the segments.

3. The method of claim 1, wherein the circular buffer area and video file area include blocks of fixed sizes.

4. The method of claim 1, wherein the disposing of the video file area comprises uncontinuously arranging video file blocks in the video file area.

5. The method of claim 2, wherein the disposing of the video file area comprises uncontinuously arranging video file blocks in the video file area.

6. The method of claim 1, further comprising disposing a general file area in a predetermined fourth position of the recording medium, for managing files of information other than continuous data like video information.

7. The method of claim 2, further comprising disposing a general file area in a predetermined fourth position of the recording medium, for managing files of information other than continuous data like video information.

8. The method of claim 3, further comprising disposing a general file area in a predetermined fourth position of the recording medium, for managing files of information other than continuous data like video information.

9. A method of arranging divided recording area segments of a recording medium in a broadcast receiving system having a hard disk drive, comprising:
   disposing a circular buffer area at the center of the hard disk drive, for recording a first broadcast signal in real time while reproducing a previously recorded second broadcast signal;
   disposing a first video file area and a second video file area respectively in an outer circumferential portion and an inner circumferential portion of a recording surface of the hard disk drive, for recording a third broadcast signal in a logical file at a predetermined time;

disposing a general file area at a boundary of the circular buffer area, for managing files of information other than continuous data like video information; and disposing a control information area between the circular buffer area and the first video file area, for recording information about the first, second and third broadcast signals.

10. The method of claim 9, wherein the circular buffer area is symmetrical with respect to a center track of the hard disk drive recording surface.

11. A method of arranging divided recording area segments of a recording medium in a broadcast receiving system having a hard disk drive, the method comprising:

forming a predefined first area on the recording medium, for recording a first broadcast signal which is currently being broadcast and reproducing a second broadcast signal previously recorded in real time; and forming a second predefined area different from the first predefined area on the recording medium, for recording a third broadcast signal at a reserved time.

12. The method of claim 11, further comprising:

forming a third area on the recording medium, for recording information relating to the first through third broadcast signals.

13. The method of claim 11, wherein:

the first area is a circular buffer area which has blocks of fixed sizes and contains continuous data; and the second area is a video file area which has blocks of fixed sizes and contains uncontinuous data in logical files.

14. The method of claim 11, wherein the forming of the second area comprises:

forming a first file area at an outer peripheral side of the first area; and forming a second file area at an inner peripheral side of the first area;

wherein the third broadcast signal is to be recorded in one of the first and second file areas, and a fourth broadcast signal is already recorded in the other one of the first and second file areas.

15. The method of claim 11, further comprising:

simultaneously selecting time-delayed watching and reproduction; and reading the first through third broadcast signals in an ascending track number order in a C-LOOK algorithm.

16. The method of claim 14, wherein the forming of first area comprises:

forming the first area so as to have tracks at both sides of a center track of the recording medium.

17. The method of claim 13, further comprising:

forming a fourth area to store information other than continuous information of video streams.

18. A method of processing broadcast signals from/on a recording medium in a broadcast receiving system having a hard disk drive, wherein the recording medium has a first predefined area, for recording a first broadcast signal which is currently being broadcast and reproducing a second broadcast signal previously recorded in real time, and a second predefined area different from the first defined area, for recording a third broadcast signal at a reserved time, and a fourth broadcast signal previously recorded, the method comprising:

inputting the first and third broadcast signals simultaneously in a first period;

recording the first and third broadcast signals on the first and second areas, respectively, and reading the second and fourth broadcast signals from the first and second areas, respectively, in a second period next to the first period; and reproducing the read second and fourth broadcast signals in a third time period next to the second period.

19. A computer readable medium in a broadcast receiving and recording system having a hard disk drive, wherein the computer readable medium includes a software execeuted by the computer to create areas, comprising:

a first predefined area to record a first broadcast signal which is currently being broadcast and reproduce a second broadcast signal previously recorded in real time; and a second predefined area different from the first predefined area, to record a third broadcast signal at a reserved time.

20. The computer readable medium of claim 19, further comprising:

a third area to record information relating to the first through third broadcast signals.

21. The computer readable medium of claim 19, wherein:

the first area is a circular buffer area which has blocks of fixed sizes and contains continuous data; and the second area is a video file area which has blocks of fixed sizes and contains uncontinuous data in logical files.

22. The computer readable medium of claim 19, wherein the second area comprises:

a first file area at an outer peripheral side of the first area; and a second file area at an inner peripheral side of the first area;

wherein the third broadcast signal is to be recorded in one of the first and second file areas, and a fourth broadcast signal is already recorded in the other one of the first and second file areas.

23. The computer readable medium of claim 19, wherein the first area comprises:

tracks at both sides of a center track of the recording medium.

24. The computer readable medium of claim 20, further comprising:

a fourth area to store information other than continuous information of video streams.

25. A broadcast receiving system, comprising:

a hard disk drive having a hard drive; and a controller which forms a first predefined area on the recording medium, for recording a first broadcast signal which is currently being broadcast and reproducing a second broadcast signal previously recorded in real time, and forms a second predefined area different from the first predefined area on the recording medium, for recording a third broadcast signal at a reserved time.

26. The broadcast receiving system of claim 25, wherein the controller forms a third area on the recording medium, for recording information relating to the first through third broadcast signals.

27. The broadcast receiving system of claim 25, wherein:

the first area is a circular buffer area which has blocks of fixed sizes and contains continuous data; and the second area is a video file area which has blocks of fixed sizes and contains uncontinuous data in logical files.

28. The broadcast receiving system of claim 25, wherein the controller forms the second area to comprise:
- a first file area at an outer peripheral side of the first area; and
- a second file area at an inner peripheral side of the first area;
- wherein the third broadcast signal is to be recorded in one of the first and second file areas, and a fourth broadcast signal is already recorded in the other one of the first and second file areas.

29. The broadcast receiving system of claim 25, further comprising:
- an input device to simultaneously select time-delayed watching and reproduction; and
- wherein the controller reads or records the first through third broadcast signals in an ascending track number order in a C-LOOK algorithm.

30. The broadcast receiving system of claim 28, wherein the controller forms the first area so as to have tracks at both sides of a center track of the hard drive.

31. The broadcast receiving system of claim 30, wherein the controller forms a fourth area to store information other than continuous information of video streams.

32. The broadcast receiving system of claim 25, further comprising:
- a random access memory to temporarily store the first through third broadcast signals prior to recording on and subsequent to reading from the recording medium; and
- a video recovery unit to restore the first through third broadcast signals reproduced read from recording medium and temporarily stored in the random access memory to respective original signals.

33. The broadcast receiving system of claim 32, further comprising:
- a timer to set the reserved time.

34. The broadcast receiving system of claim 32, further comprising:
- a broadcast signal receiver comprising
  - a first radio frequency tuner to receive an external digital broadcast signal as the first, second or third broadcast signal,
  - a second radio frequency tuner to receive an external analog broadcast signal,
  - a video compressor to convert the received analog signal to a digital signal and compress the digital signal as the first, second or third broadcast signal, and
  - a selector to selectively enable transmission of the external digital broadcast signal and the compressed digital signal to the random access memory.

35. The broadcast receiving system of claim 25, wherein the controller comprises:
- a read only memory to store control program data to control the hard disk drive; and
- a random access memory to temporarily store data generated during control operations of the hard disk drive.

36. A broadcast receiving system for processing broadcast signals from/on a recording medium in a broadcast receiving system having a hard disk drive, wherein the recording medium has a first predefined area, for recording a first broadcast signal which is currently being broadcast and reproducing a second broadcast signal previously recorded in real time, and a predefined second area different from the first predefined area, for recording a third broadcast signal at a reserved time, and a fourth broadcast signal previously recorded, the broadcast receiving system comprising:
- a random access memory to receive the first and third broadcast signals simultaneously in a first period,
- a hard disk drive to record the first and third broadcast signals on the first and second areas, respectively, and reading the second and fourth broadcast signals from the first and second areas, respectively, in a second period next to the first period; and
- a video recovery unit to reproduce the read second and fourth broadcast signals in a third time period next to the second period.

* * * * *

UNITED STATES PATENT AND TRADEMARK OFFICE
CERTIFICATE OF CORRECTION

PATENT NO. : 7,068,921 B1 Page 1 of 1
APPLICATION NO. : 09/628810
DATED : June 27, 2006
INVENTOR(S) : Chong-Mok Park It is certified that error appears in the above-identified patent and that said Letters Patent is hereby corrected as shown below:

Column 8, Line 9, change "exeecuted" to --executed--.

Column 10, Line 30, after "period" change "," to --;--.

Signed and Sealed this

Sixteenth Day of January, 2007

JON W. DUDAS
*Director of the United States Patent and Trademark Office*